United States Patent [19]

Behlmann et al.

[11] Patent Number: 4,978,023
[45] Date of Patent: Dec. 18, 1990

[54] INSULATED MODULAR COOLER

[76] Inventors: Timothy J. Behlmann, Marianne Behlmann, both of 4126 Domenique, Florissant, Mo. 63034

[21] Appl. No.: 497,520

[22] Filed: Mar. 22, 1990

[51] Int. Cl.⁵ ............................................. B65D 85/28
[52] U.S. Cl. .................................. 220/23.6; 220/23.83; 220/4 A; 206/821; 206/501; 206/545
[58] Field of Search ................. 220/23.6, 23.83, 23.86, 220/4 A; 206/821, 501, 545

[56] References Cited

U.S. PATENT DOCUMENTS

| | | |
|---|---|---|
| 204,119 | 5/1878 | Wilson . |
| 315,915 | 4/1885 | Dean . |
| 2,217,222 | 10/1940 | Hall . |
| 2,570,300 | 10/1951 | Acton . |
| 3,447,711 | 6/1969 | Bozek .................................. 220/4 E |
| 3,521,777 | 7/1970 | Vik ...................................... 206/821 |
| 3,802,593 | 4/1974 | Bridges .............................. 220/23.6 |
| 4,089,414 | 5/1978 | Sandor et al. ...................... 220/23.6 |
| 4,116,332 | 9/1978 | Hartley ............................... 206/821 |
| 4,517,815 | 5/1985 | Basso . |
| 4,619,363 | 10/1986 | Wolfseden ......................... 220/23.6 |
| 4,666,034 | 5/1987 | Johnson et al. .................... 220/23.6 |

FOREIGN PATENT DOCUMENTS

257478 10/1967 Austria .
943182 12/1963 United Kingdom .

*Primary Examiner*—Joseph Man-Fu Moy
*Attorney, Agent, or Firm*—Andsel Group

[57] ABSTRACT

A modular cooler that is made of individually insulated modular cooler compartment units that can be stacked together to make a custom sized cooler for any occasion needed. The basic unit is a cylindrical bottom container having specific interlocking structure on its top edge. A tubular compartment unit having mating interlocking structure on its bottom edge is detachably engaged with the interlocking structure of the bottom container unit. A locking ring surrounds both of these interlocking structures and by rotating it a short predetermined distance the two units can be locked together or unlocked. One form of locking ring has a solid central wall that forms it into a compartment divider. Additional units can be stacked together by using additional tubular compartment units and locking rings. A disc-shaped top cover has interlocking structure on its bottom edge. O-rings are positioned between the interlocking structures to make the adjacent compartment watertight and airtight.

7 Claims, 2 Drawing Sheets

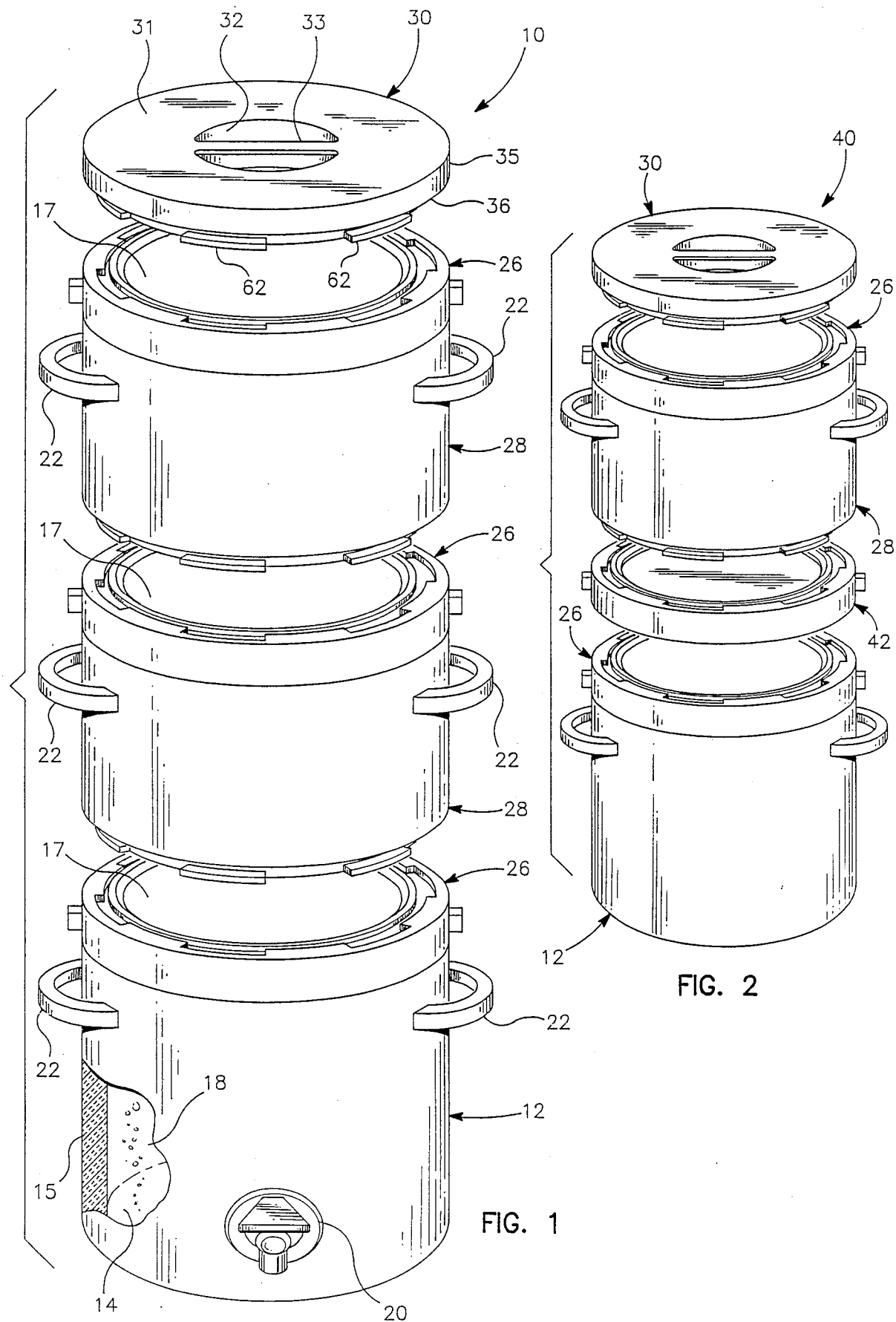

INSULATED MODULAR COOLER

BACKGROUND OF THE INVENTION

The invention relates generally to storage receptacles and more particularly to a storage container for food products and drinks and having structure for keeping them hot or cold.

Presently there are coolers for carrying food and drinks of all sizes and shapes. One of the major drawbacks to these coolers is there isn't any flexibility as to their size. Often the cooler one uses for a major outing is the same one used to carry drinks and snacks. In this situation the large container is cumbersome when most of its storage space is not being used.

Also most coolers do not have distinct compartments for storing different types of items. The coolers generally lack structure for storing a liquid that is not in a container. Also most coolers are not watertight or airtight.

It is an object of the invention to provide a novel cooler that has modular units that can be connected together to create a variety of sizes for storing different food articles or drinks in separate compartments or non divided compartments.

It is also an object of the invention to provide a novel cooler that provides watertight and airtight compartments for storing different types of food or liquids.

It is another object of the invention to provide a novel cooler that is lightweight and easy to carry.

It is an additional object of the invention to provide a novel insulated cooler that is economical to manufacture and market.

SUMMARY OF THE INVENTION

The insulated modular cooler has as its basic component a cylindrical bottom container unit. Its bottom wall and side walls are made of insulating material. A spigot assembly is mounted on its side wall and handles are provided for carrying it.

The top edge of the bottom container unit has an upstanding annular ridge and a horizontal annular channel formed adjacent its outer edge. This structure interlocks with other modular units such as the top cover, tubular compartment units, and compartment divider units. Each of the just named structures have a mating annular channel formed in their bottom edge along with a horizontal annular channel formed adjacent its outer edge. A locking ring captures part of the interlocking structure of the two mating components and by rotating the locking ring a short distance, the two structures are securely locked together. An O-ring is positioned at a predetermined location between the top and bottom edges of the innerlocking members to provide a seal that is watertight and airtight.

BRIEF DESCRIPTION OF THE DRAWINGS

FIG. 1 is an exploded front perspective view showing the insulated modular cooler and the components that would be used to give it an expanded cylindrical chamber therein;

FIG. 2 is an exploded front perspective view illustrating the insulated modular cooler using a divider component that would divide it into separate storage chambers;

DESCRIPTION OF THE PREFERRED EMBODIMENT

Figure 3:
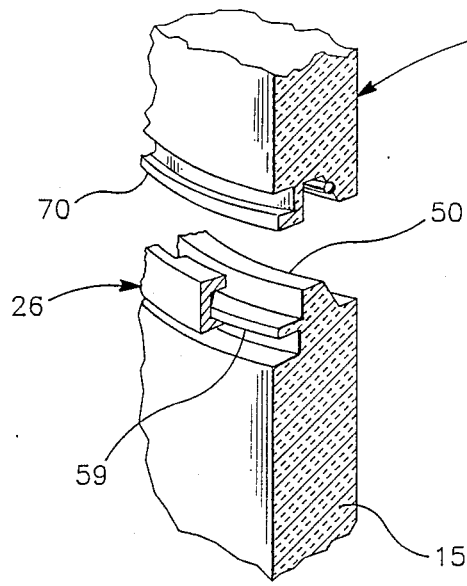
FIG. 3 is a partial exploded view of the interlocking structure with portions shown in cross-section.

Referring now to FIGS. 1-6 of the drawings, the novel insulated modular cooler will now be described. The modular cooler is generally designated numeral 10.

In FIG. 1, modular units have been assembled to form a single expanded storage chamber. Bottom container unit 12 has a bottom wall 14 and an annular side wall 15 formed of insulating material. A chamber 17 is formed therein and it might be used to carry a liquid 18 such as water. A spigot assembly 20 is located in annular side wall 15. A pair of handles 22 are formed as part of the side walls.

A locking ring 26 is attached to the top edge of bottom container unit 12. A tubular compartment unit 28 has interlocking structure that mates with locking ring 26 on its bottom edge. Another locking ring 26 is connected to interlocking structure adjacent the top edge of tubular compartment unit 28. A disc-shaped top cover 30 has interlocking structure on its bottom edge that connects with interlocking structure of the upper most locking ring 26.

Disc-shaped top cover 30 has a top surface 31 having semicircular recesses 32 and a diametrically extending rib 33. It has a side wall 35 with a bottom edge 36. The interlocking structure on its bottom edge will be described later.

The insulated modular cooler assembled in FIG. 2 is generally designated numeral 40. It has a disc-shaped top cover 30 that interlocks with locking ring 26. Locking ring 26 in turn is detachably engaged with a top edge of the interlocking structure of tubular compartment unit 28. The interlocking structure on the bottom edge of tubular compartment 28 is matingly received in compartment divider unit 42. It is almost identical to locking ring 26 except for the fact it includes a central top wall 44. This produces separate storage chambers above and below central top wall 44.

Figure 4:
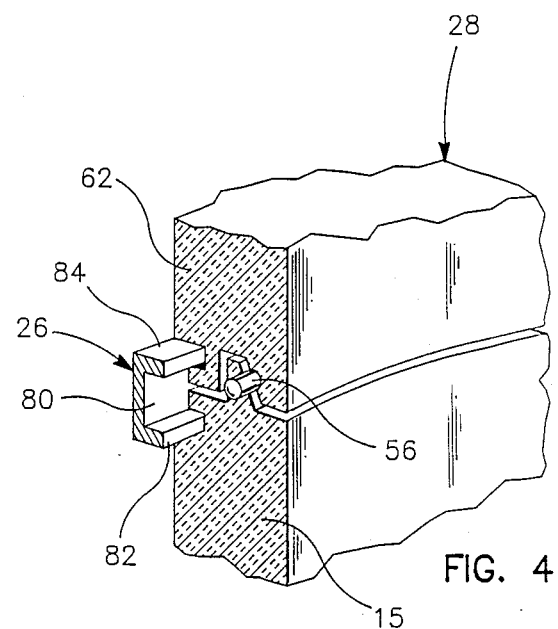
FIG. 4 is a partial perspective view of the structure illustrated in FIG. 3 in its interlocked state.
Figure 5:
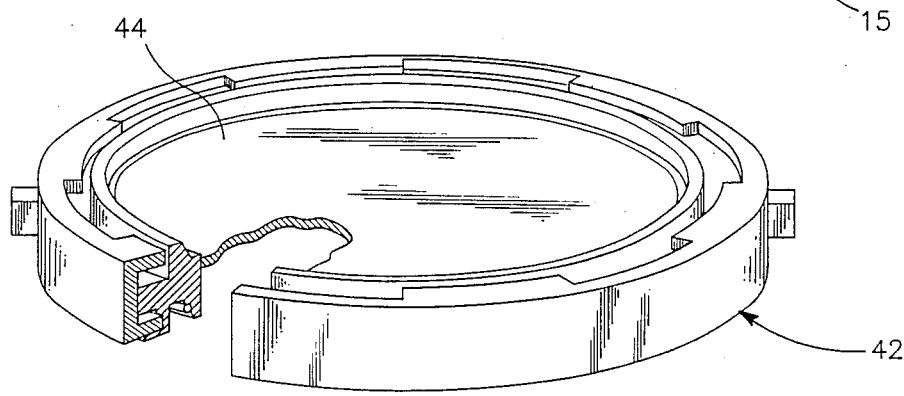
FIG. 5 is a front perspective view of a compartment divider unit.
Figure 6:
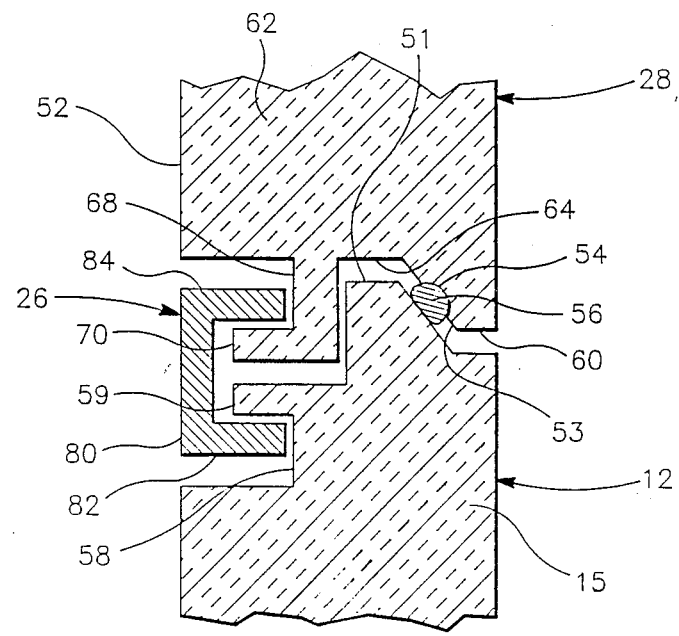
FIG. 6 is a partial cross sectional view illustrating the interlocking structure of adjacent components.

The specific interlocking structure of all the basic components is best illustrated by referring to FIGS. 3, 4 and 6. In FIG. 6, the top edge of bottom container unit 12 is seen interlocked with the bottom edge of tubular compartment unit 28. The bottom edge of tubular compartment 28 is the same as the bottom edge of disc-shaped top cover 30 and the bottom edge of the compartment dividers 42. Bottom container unit 12 has annular side walls having a top edge with an annular ridge 50 having a top wall 51, an outer upright wall 52 and an inner upright wall 53. An annular recess 54 is formed in inner upright wall 53 and an O-ring 56 is positioned therein. The outer edge of annular side wall 15 has a relieved portion that forms a horizontal annular channel 58 and an upper flange 59.

The bottom edge 60 of the annular side walls 62 of tubular compartment unit 28 have an annular channel 64 formed therein that matingly receives annular ridge 50. The outer periphery of bottom edge 60 is relieved to form a horizontal annular channel 68 and it includes a graduated lower flange 70.

Locking ring 26 has an annular vertical portion 80. A lower annular flange 82 extends inwardly therefrom and mates with horizontal channel 58. An upper annular flange 84 extends inwardly from the top edge of annular vertical portion 80 and it interlocks with horizontal annular channel 68. Upper flange 84 has relieved or cutout areas as does lower flange 70 so that they may pass by each other in their unlocked position and will be firmly secured to each other in their locked position. The locking position is accomplished by a slight rotation of the locking ring 26.

What is claimed is:

1. An insulated modular cooler comprising:
   a cylindrical bottom container unit having an annular side wall that has a top edge and a bottom edge, said bottom edge being connected to a bottom wall that closes the bottom end of said container;
   said top edge of said bottom container having a predetermined thickness from its inner edge to its outer edge, an annular ridge extends upwardly a predetermined height from said top edge;
   said top edge of said bottom container having a relieved area adjacent its outer edge in the shape of a horizontally oriented annular channel that forms a horizontally oriented upper flange;
   a locking ring having a horizontally oriented U-shaped cross section having an annular vertical portion with inwardly extending upper and lower annular flanges, said lower annular flange interlockingly mating with the horizontally oriented annular channel at the top edge of said bottom container, said upper annular flange having arcuate cutout portions spaced at predetermined intervals around its inner edge; and
   a disc-shaped top cover whose bottom edge has an annular channel that matingly interlocks with the annular ridge on the top edge of said bottom container, the bottom surface of said top cover also having a relieved area adjacent its outer edge in the shape of a horizontally oriented annular channel that forms a horizontally oriented graduated lower flange, said graduated lower flange having relieved arcuate sections at predetermined intervals around its outer edge so that said flange can mate with arcuate cutout portions on the top surface of said bottom container, after which said locking ring can be rotated a predetermined distance to lock said two members together.

2. An insulated modular cooler as recited in claim 1 wherein said bottom container, tubular compartment units and cover are made of insulating material.

3. An insulated modular cooler as recited in claim 2 further comprising at least one tubular compartment unit having a predetermined height, said tubular compartment unit having a top edge and a bottom edge, said bottom edge having an interlocking structure the same as that on the bottom edge of said top cover so they may be detachably interlocked together;
   said tubular compartment having interlocking structure on its top edge the same as that on the top edge of said bottom container unit so that they may be detachably interlocked together; and
   at least one locking ring having structure such as recited in claim 1 for each of said tubular compartments.

4. An insulated modular cooler as recited in claim 3 wherein at least one of said locking rings has a solid central wall that makes it into a compartment divider.

5. An insulated modular cooler as recited in claim 2 further comprising a stationery O-ring positioned against said annular ridge that extends downwardly from the bottom edge of said tubular compartment units, said divided section and disc shaped cover.

6. An insulated modular cooler as recited in claim 2 wherein said bottom container has a spigot assembly.

7. An insulated modular cooler as recited in claim 2 wherein said bottom container and tubular compartment units have handles on its side walls.

* * * * *